United States Patent
Tonarelli et al.

(10) Patent No.: US 10,038,328 B2
(45) Date of Patent: Jul. 31, 2018

(54) DIGITAL TEMPERATURE CONTROL FOR POWER SUPPLY DEVICES

(71) Applicant: Dialog Semiconductor (UK) Limited, London (GB)

(72) Inventors: Marco Tonarelli, Massa (IT); Andrea Lazzeri, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 81 days.

(21) Appl. No.: 15/255,644

(22) Filed: Sep. 2, 2016

(65) Prior Publication Data

US 2017/0063121 A1    Mar. 2, 2017

(30) Foreign Application Priority Data

Sep. 2, 2015 (DE) .......................... 10 2015 216 809

(51) Int. Cl.
| | |
|---|---|
| *H02J 7/00* | (2006.01) |
| *H02M 3/04* | (2006.01) |
| *H02M 3/155* | (2006.01) |
| *H02M 1/32* | (2007.01) |

(52) U.S. Cl.
CPC .......... *H02J 7/0052* (2013.01); *H02J 7/0091* (2013.01); *H02M 3/04* (2013.01); *H02M 3/155* (2013.01); *H02J 2007/0059* (2013.01); *H02M 2001/327* (2013.01)

(58) Field of Classification Search
CPC ... H02J 7/0052; H02J 2007/0059; H02M 3/04
USPC ........................................................ 320/107
See application file for complete search history.

(56) References Cited

U.S. PATENT DOCUMENTS

| | | | | |
|---|---|---|---|---|
| 4,190,486 A | * | 2/1980 | Kyle ...................... | C30B 11/00 117/3 |
| 4,320,797 A | * | 3/1982 | Kagohata ........... | B60H 1/00642 165/204 |
| 4,441,545 A | * | 4/1984 | Alley et al. ........ | G05D 23/1912 165/209 |

(Continued)

FOREIGN PATENT DOCUMENTS

| | | |
|---|---|---|
| DE | 102011107913 | 1/2013 |
| WO | WO 92/11680 | 7/1992 |

OTHER PUBLICATIONS

German Office Action, File Number 10 2015 216 809.3, Applicant: Dialog Semiconductor (UK) Ltd, dated Apr. 5, 2016, 9 pgs, and English language translation, 11 pgs.

*Primary Examiner* — Sun Lin
(74) *Attorney, Agent, or Firm* — Saile Ackerman LLC; Stephen B. Ackerman

(57) ABSTRACT

A digital temperature control method for power supply integrated circuits (ICs) is disclosed. The method acts on one or more system variables. For each system variable, the method comprises measuring a temperature of a power supply IC; converting the measured temperature to a digitized temperature; comparing the digitized temperature to at least one temperature threshold; selecting a digital control algorithm from a plurality of digital control algorithms and applying the selected digital control algorithm on a controlled system variable associated with the selected digital control algorithm, thereby obtaining a control value; verifying the obtained control value; and applying the verified control value to control the power supply IC to an external device.

26 Claims, 8 Drawing Sheets

(56) References Cited

U.S. PATENT DOCUMENTS

| | | | |
|---|---|---|---|
| 6,889,513 B1 * | 5/2005 | Clark | B60H 1/00271 123/541 |
| 9,326,426 B2 * | 4/2016 | James et al. | H05K 7/20572 |
| 2007/0052461 A1 | 3/2007 | Zhang | |
| 2013/0198541 A1 | 8/2013 | Rabii | |
| 2014/0203761 A1 | 7/2014 | Paparrizos et al. | |

* cited by examiner

DIGITAL TEMPERATURE CONTROL FOR POWER SUPPLY DEVICES

TECHNICAL FIELD

The present document relates to a digital power supply control method for controlling temperature of devices supplied with power, and a power supply device, in particular a battery charger or a power management integrated circuit (PMIC).

BACKGROUND

Integrated power supply devices provide power to other devices and/or control the power consumption of these devices, which may be batteries, CPUs, controllers, etc. A major concern with power delivery is the temperature resulting from dissipating power in the power supply device itself or the supplied device. This temperature must be controlled because a temperature being too high can cause damage to the power supply device or to the supplied device. Typically, analog and custom-designed temperature control schemas are used e.g. in battery chargers. Known digital implementations provide only very simple control, e.g. by switching power on or off.

SUMMARY

The present document proposes a digital programmable thermal control schema to control power supplied to a load in order to regulate the power dissipated by the power supply itself or by the load. It allows providing power with the highest possible current which avoids that an over-stressing temperature for the power supply device and/or the supplied device is reached. The suggested solution is highly programmable and can be adapted to different devices and applications. For example, the proposed solution reduces charging time in a battery charging application. The thermal control schema avoids over heating when the battery is heavily discharged due to linear charger high power dissipation and overcomes suboptimal charge current limitations that are otherwise applied to avoid the above over-heating. The proposed thermal control schema is a digitally controlled thermal regulation for at least one controlled system variable.

The control schema is closed loop. In a basic implementation, an integrating controller may be used, i.e. a controller that integrates the error signal. In other implementations, a proportional and/or a derivative factor may be used as control approach (i.e. a PI-type or a PID controller). However, different solutions could be implemented too, e.g. adding further control contributions.

The applied control coefficients may be programmable. Thus, the proposed solution can be easily applied to control different signals or variables and used in different applications. In other words, it is not an ad-hoc solution to control charge current only, or input current (from e.g. an USB input) only.

The main input of the control loop is an internal temperature of the power supply device or of the device supplied with power. However, the proposed solution allows the reading of the temperature from different sources (usually via internal temperature sensors). This allows the control of the temperature more locally. For example, the digital control loop controlling a system signal or variable in a charger buck (and so mainly the temperature of the charger buck) can use information coming from a sensor close to the charger buck, thus avoiding local overheating of the charger buck itself. This is useful because the temperature inside an IC can be different in different positions of the IC itself. In other words, there is the possibility to use different temperature sensors, each temperature sensor can be positioned close to the heat source that is controlled by an associated controlled signal. This allows increasing the performance because higher power can be delivered without local overheating.

The proposed thermal control schema may be adaptive, i.e. different coefficients can be used for different temperature ranges. This allows increasing the dynamic performance while still maximizing the power that can be delivered and still efficiently controlling the temperature.

The proposed thermal control schema may be programmable. Due to the programmability and the proposed architecture, the solution can be easily applied to control different signals/variables in different applications. There may be several different options for programming, e.g. a target temperature that should be regulated, a temperature under which the control doesn't act, a minimum and maximum value for the controlled variable, a temperature acquisition rate, a selection of read temperature sensor, a number of temperature sensors that can be read, a controlled signal update rate, an enable/disable of the control loop depending on the charging phase. Not all these programmability options are essential to correct operation, but they may increase the performance and reusability of the proposed thermal control schema.

The same thermal control schema can be applied to different signals or variables of controlled systems. This allows applying the proposed solution to different ICs/applications, not only to a battery charger during charging, but also during other phases of operation of the battery charger or in general to all power management ICs. In fact, the thermal control schema could control not only a charger buck (e.g. its input current or charge current) and a linear charger power consumption in a battery charger, but also power consumption of other bucks, boosts, LDOs etc. The proposed solution guarantees the possibility to easily expand the control applying it to a different variable. This allows more complex control schemas to be built up. For example, different control loops can have a different target temperature that they regulate, and the loops can start acting with a defined priority. E.g. in a charger buck, the charge current control can have an higher priority with respect to the input current, so that, at first, the charge current is decreased and only as a second choice, the input current (and so the current that can be provided to the load) starts to be limited.

In a broad aspect, a digital power supply control method is disclosed. The method may comprise measuring a system temperature by a temperature sensor and converting the measured temperature to a digitized temperature. The temperature may be an internal (to the IC) temperature in a power supply device, or an external temperature provided by an external device which receives power from the power supply device, or which power dissipation is controlled by the power supply device. The digitized temperature may be compared to at least one temperature threshold.

The method may further comprise selecting a digital control algorithm from a plurality of provided digital control algorithms and applying the selected digital control algorithm on a controlled system variable or signal associated with the selected digital control algorithm. By applying the selected digital control algorithm on the controlled system variable (i.e. regulating the controlled system variable) a control value is obtained. The plurality of digital control algorithms may implement different digital control loops for different system variables. The controlled system variables may be signals or variables for controlling the power supply device, such as input or output currents, and/or signals or variables that control power dissipation of the supplied device. The control algorithm may include modifying the system variable by a given control approach such as applying a PID regulation or others.

The method may further comprise verifying the obtained control value to make sure that it is within given operating ranges of the system variable. For example, the control value may be limited to be within given minimum and maximum values. Finally, the verified control value may be applied to control the device under control, i.e. to control the power supplied to the external device (and so the power dissipated internally by the power supply itself), or to control the operation of the external device.

Selecting a digital control algorithm may be based on a power supply device status that is applied to supply power to the external device. For example in a battery charger application, the power supply status may be the charger status, e.g. charging on, fast charge, pre-charge, etc. Each power supply status may have one or more associated digital control algorithms to regulate the temperature while the power supply device is operating in the respective power supply status. This allows selection of a dedicated digital control algorithm for each device status.

The measured temperature may be compared with a plurality of temperature thresholds and selecting a digital control algorithm may be based on the comparing result with the temperature thresholds. Thus, depending on whether the temperature exceeds one or more thresholds, a respective digital control algorithm may be selected. In other words, selection of the digital control algorithm may depend on temperature.

The selection of a digital control algorithm may be based on a priority assigned to each digital control algorithm. This allows a priority based selection schema for the control algorithms where the order for activating the digital control algorithms can be predetermined by assigning respective priorities.

The selection of a digital control algorithm may be based on a target temperature assigned to each digital control algorithm. For example, the loop having the lowest target temperature may be selected to act first. In general, the loops may be activated in order of their associated target temperatures. In embodiments, more than one loop may be activated depending on their associated target temperatures.

A plurality of chip temperatures may be measured and each temperature may be associated with a digital control algorithm. The selection of a digital control algorithm may be based on the measured temperatures. For example, the loop having the highest measured temperature associated therewith may be selected to act first. In general, the loops may be activated in order of their associated measured temperatures. In embodiments, more than one loop may be activated depending on their measured temperatures.

The above selection mechanisms for the applied digital control algorithm may further be combined to implement more complex control algorithms.

It must be noted that some or all of the digital control algorithms may be implemented based on a generic control algorithm that can be parameterized for implementing different control strategies depending on the result of the selection. In addition, each control algorithm has one or more associated system variables that are controlled by the respective control algorithm. In other words, selecting the control algorithm also determines which system variable is controlled to regulate the temperature.

In embodiments, a plurality of chip temperatures may be measured. Each temperature may be associated with a dedicated digital control algorithm. Hence, several control loops may be performed and possibly multiple system variables controlled. Furthermore, one or more control algorithms may be selected as described above based on the various selection criteria, and in consequence, several system variables may be controlled. For example, the selection of a digital control algorithm may be based on the measured temperature(s) exceeding temperature thresholds associated with the digital control algorithms.

The digital control algorithms may be programmable closed loop control algorithms implementing different control approaches. Each control algorithm may have at least one programmable control parameter that can customize a generic control algorithm. Thus, a high reusability and portability of the proposed solution is achieved.

At least one digital control algorithm may have different control parameters for different temperature ranges. Selecting a digital control algorithm may then, in part, comprise selecting control parameters for at least one digital control algorithm based on the measured temperature. Thus, the applied control loop is adaptive on the temperature, and a more precise control is possible.

The controlled system variables may relate to internal voltage or current of the power supply device, such as input voltage of a linear charger or low dropout regulator (LDO), or input current of a buck converter. The system variables may also relate to voltage or current supplied to the external device, such as a charging current or output voltage of a battery charger. For example, the system variable may be a system frequency, e.g. an internal clock that controls operation of the power supply device or the external device. Controlling the frequency may then control the current consumption of the circuit and so the frequency can be considered a system variable related to the current. Other examples for system variables will be apparent from the following description.

The measured temperature or temperatures may relate to an internal temperature of a power supply device, such as a temperature of a power converter or linear charger. In addition or alternatively, the measured temperature or temperatures may relate to an external temperature of the external device, measured e.g. by the external device and supplied to the power supply device.

Verifying the obtained control value may comprises comparing the control value with a minimum and/or maximum value of the system variable associated with the selected digital control algorithm to ensure that certain limits for the control value are met.

Another broad aspect of this disclosure relates to a power supply device for providing power to an external device. The power supply device may be configured to perform any of the methods as described above.

The power supply device may comprise an analog section having a power supply unit and at least one temperature sensor to measure a local die temperature of the power supply unit. The power supply device may further comprise an analog-to-digital converter to convert the measured temperature to a digital value for processing by a digital control loop. The power supply device may further comprise a digital section having a control unit and a memory to store threshold values and programmable parameters of the digital control algorithms. The control unit may select a digital control algorithm as described above and perform the corresponding digital control loop, possibly by applying control parameters that are associated with the selected digital control algorithm. The power supply device may further comprise a digital-to-analog converter to convert a control value determined by the control unit to the analog domain for applying the control value in regulating the temperature of the device under control.

In embodiments, the power supply unit may be a battery charger and e.g. comprise a buck converter. The power supply unit may further comprise a linear charger or a battery switch. The system variable(s) may include at least the input current to the buck converter and/or the charging current provided to the external device by the linear charger or by the battery switch. In this case, the external device may be a rechargeable battery.

In embodiments, the power supply unit may be a battery charger and comprise a linear charger and an optional battery switch. The system variable(s) may include at least the input current to the linear charger and the charging current provided to the external device by the linear charger or the optional battery switch. In this case, the external device may be a rechargeable battery.

In embodiments, the power supply device may be a power management control unit for a portable device controlling power dissipated by the portable device, e.g. a power management IC integrated circuit (PMIC). At least one measured temperature may correspond to a load of the portable device, such as a CPU, a display or a wireless transceiver. The power management control unit may control the operation of the portable device by providing control signals to the portable device, depending on the measured temperature and by applying the above disclosed control method. For example, the control signals may control the load of the portable device by switching the load on or off depending on the measured temperature. The control signals may also control power dissipation of the load in a more complex way.

The disclosed digital programmable thermal control schema has the following advantages compared with the current practices and prior art. It provides higher programmability and higher scalability. Each control loop can be independently enabled/disabled and is independently configurable. It can be easily extended, e.g. applied to several different signals. There is the possibility to configure the control schema for different applications and it provides better control with respect to other digital implementations.

The proposed solution can be tried on already existing power supply IC. In fact, in any IC where the temperature information is available from outside and the controlled variable (e.g. charge current) can be externally controlled, the proposed control loop can be tested and tuned before implementing it on the next IC version. This is an advantage with respect to purely analog control solutions which are ad hoc and can't be tested or prototyped on an already existing IC without a re-spin The proposed solution is technology independent. The digital solution is more general and doesn't require ad-hoc design for each controlled variable. The same implementation (HDL (Hardware Description Language) code i.e. code used to design digital circuits) can be used for more loops and to control different variables.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

The present disclosure concerns thermal control of a power management IC, and is focused, but not limited to, a battery charger IC. The field of use of a battery charger is typically portable devices (e.g. smartphones), but the proposed circuitry/method can be applied to other different applications.

The basic idea is to control a programmable number of signals internal to the device under control (e.g. a high voltage battery charger IC) in order to keep the die temperature under control. Each signal is controlled by a dedicated control loop.

Figure 1:
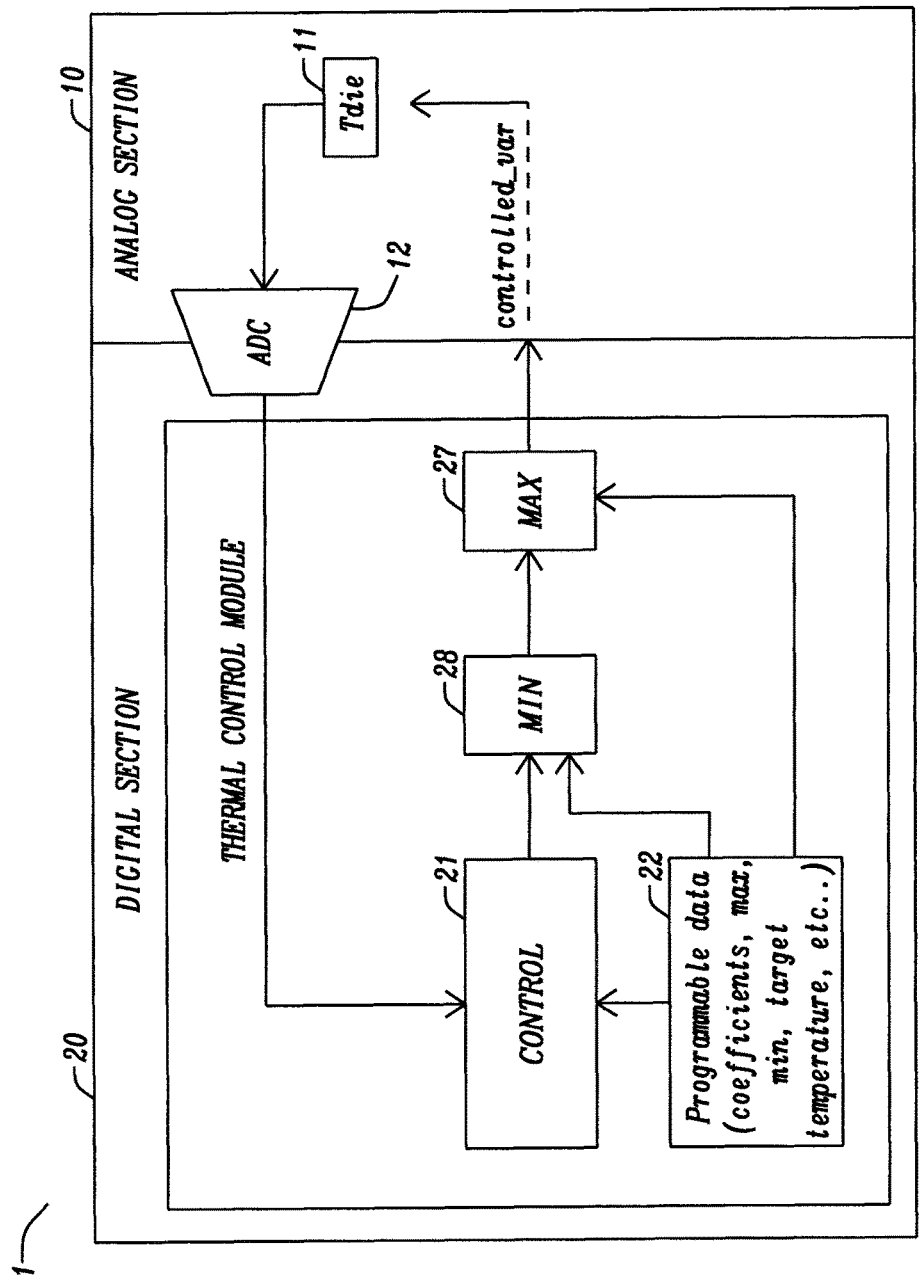
FIG. 1 shows an illustrative diagram of a basic control schema.

FIG. 1 shows an illustrative diagram of a basic control device 1 having an analog section 10 and a digital section 20 implementing a thermal control module. Each control loop (1) includes die temperature reading, (2) implements a thermal control algorithm and (3) acts on a variable that affects the device power consumption in order to be able to regulate the die temperature. The thermal control algorithm is implemented by a digital control circuitry 21. A temperature sensor 11 measures the die temperature and provides the reading to an analog to digital converter ADC 12, but other methods of acquiring the temperature can be used, too. One or more temperature sensors can be provided. Each control loop can use the temperature information from different sensors. The digital control circuitry 21 is programmable and control parameters to program the control loop are stored in memory 22, such as e.g. control coefficients, maximum and minimum values for controlled variables, target temperatures, etc.

The proposed solution can be used also to control the die temperature locally, so in a specific die zone, as example using the temperature close to a charger buck (e.g. by reading a temperature sensor close to it) as input of the loop and controlling a variable/signal of the charger buck (e.g. the buck input and/or output current).

The temperature information may be read at a programmable digital input update rate. The die temperature information converted in digital data by the ADC 12 is compared to a target temperature in order to calculate temperature error information. This is implemented in the digital control block 21 in FIG. 1. The target temperature is the die temperature $T_{die}$ that the control method tries to maintain and acts if it is exceeded. The target temperature may be a programmable value. Several other parameters may be programmed too, as presented in the following. For example, maximum and minimum values for the controlled variable may be stored in memory 22 and applied by minimum operator 28 and maximum operator 27.

The temperature error data is processed by the digital control module 21 in order to calculate a corrective factor to be applied to the actual value of the controlled variable. A simple digital control module could be implemented by an integrating controller only, but in the proposed control architecture several different control methods could be used. As example, the control contributions could be, but not limited to, proportional, integral, and derivative.

Figure 2:
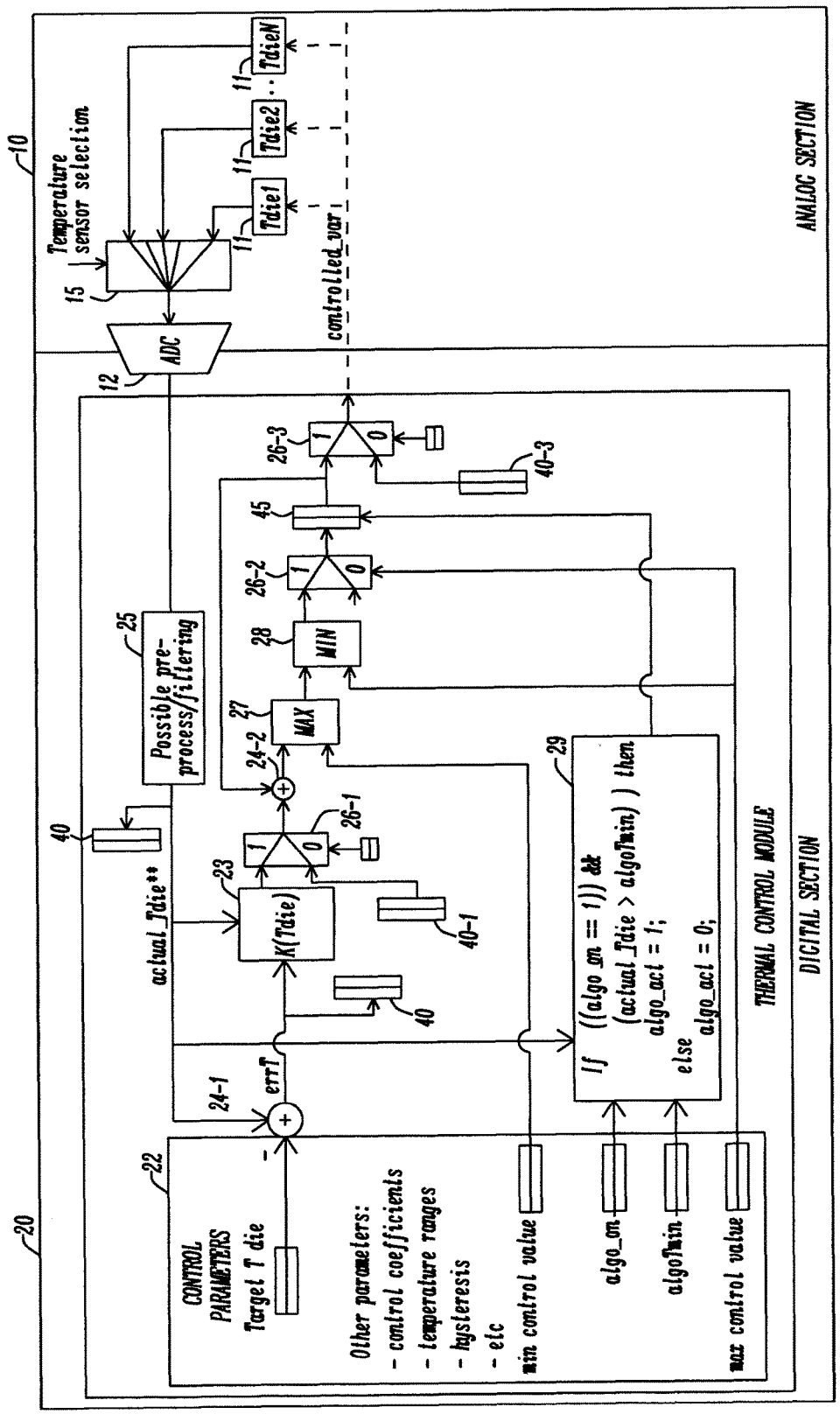
FIG. 2 shows additional details of an embodiment of a thermal control module.

The corrective factor is then applied to the system variable under control, e.g. it could be applied to the last value of the variable under control by an integrator (this is an example, see following description of FIG. 2. The calculated value is then compared with a maximum and minimum value for the controlled variable(s). These values (maximum and minimum) are programmable values and may be disabled, so that the controlled signal is not saturated.

The calculated value for the controlled signal (possibly verified to be within limits) is provided to the analog section 10 at a programmable digital output update rate and is used by the analog circuitry in order to set the new value of the controlled signal (see FIG. 1). For example, the updated value of the charge current of a battery charger is set, or the input current limit or any other controlled signal.

FIG. 2 shows some additional details of a possible implementation example of a thermal control module. This is an implementation example only, other different implementations could be used: for example, the control block can be a proportional block (applying a value proportional to the temperature error $T_{error}$) with adaptive coefficients (i.e. coefficients $K(T_{die})$ different for different temperature ranges), but could include also other control contributions (integral, derivative) or another different control (if possible). The corrective factor could be applied to the previous controlled variable value by an integrator (as in the example) or the controlled variable could be directly produced by the control block.

The signals to be controlled are the signals that affect the device power consumption. The signals controlled by the proposed method/circuitry are, but not limited to, the charge current; the supply current ($V_{bus}$ current); digital circuits frequency; output voltages of DC-DC converter(s), LDOs, etc; input and/or output currents of DC-DC converter(s), LDOs, etc.; DC-DC converter switching frequency, etc.

Each controlled variable has a dedicated control loop. Each control loop can be independently programmed and enabled/disabled. The programmability of each loop may involve a significant number of parameters, which may be stored in memory 22. The programmable parameters are, but not limited to, control coefficient values (e.g., but not limited to, proportional, integral, derivative contributions) and the possibility to set different control coefficients for each temperature range (in order to have an adaptive control), target temperature(s) to be regulated, temperature(s) at which the algorithm(s) starts acting, control loop bandwidth, control update rate, control acquisition rate, temperature sensor or sensors read to acquire the IC internal temperature, hysteresis for the temperature range of the control coefficients, maximum value of the controlled variable that can't be exceeded, minimum value for the controlled variable (that could be 0).

Each control loop could have the same architecture, thus providing high scalability to the proposed solution. The programmability guarantees that the control loops can be adapted to the different controlled variables. While FIG. 2 shows only one control loop, it is understood that other loops operate in the same way. In an implementation of the proposed control where more than one control loop is implemented and more than one loop is enabled, each control loop can be programmed in a different way, so using different update rates, control coefficient values, target temperatures etc.

Figure 5:
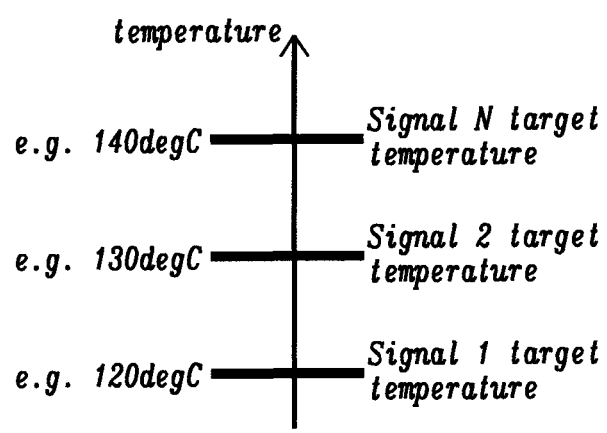
FIG. 5 is a schematic diagram to illustrate the usage of programmable temperature thresholds to produce complex control schemes.

The possibility to set different target temperatures allows to assign a priority to the controlled signals and to build up complex control schemes. As example in an implementation of the proposed solution which uses N different control loops, if the target temperatures are set as shown in FIG. 5, the control starts acting on the controlled signal 1 when the target temperature 1 is approached, then if the temperature keeps on increasing, e.g. due to the fact that the power consumption reduction obtained controlling the signal 1 is not sufficient to limit the internal temperature or to the fact that the environmental (ambient) temperature increases, the control acting on signal 2 could start working. If the internal temperature keeps on increasing, the control could start acting on further signals 3, . . . , signal N.

In more detail, referring again to FIG. 2, the analog section 10 of the control device 1 comprises a plurality N of temperature sensors 11 reading temperatures $T_{die1}$ to $T_{dieN}$, and a multiplexer 15 that is controlled to select one of the sensor signals and forward the selected temperature signal to the ADC 12 which converts the signal to a digital value that is supplied to the digital section 20 implementing a thermal control module.

In the digital section 20, an optional pre-processing/filtering unit 25 is provided to filter the digital temperature signals. Next, the selected temperature signal (actual_$T_{die}$) is fed with a negative sign to the first addition point 24-1 where it is added with the target temperature $T_{target}$ for the respective sensor to produce an error signal $T_{error}$. The target temperatures $T_{target}$ for the plurality of temperature sensors are stored in internal memory 22 where other parameters may be stored as well. For example, target temperatures, control coefficients, temperature ranges, hysteresis values, maximum and minimum values for controlled variables, temperature values where control is to be activated, and main control-on flag are parameters that can be programmed and are stored for the present application. The error signal $T_{error}$ is then supplied to a controller 23, a gain stage in the shown example that applies a constant K to the error signal. Constant K may depend on the measured temperature $T_{die}$: $K(T_{die})$. The calculated value $T_{error}*K(T_{die})$ is then fed to the second addition point 24-2 where it is added with a fed back value of the controlled variable, thereby implementing an integrator for an integrative control. The shown controller is therefore a I-type controller. It should be noted that controllers of other types may be implemented, too, e.g. by adding a proportional and a derivative contribution for achieving a PID-type controller. Multiplexer 26-1 allows selection of a fixed value from a register 40-1, or the calculated value $T_{error}*K(T_{die})$ for supply to the adding point 24-2, depending on a control signal that is supplied to MUX 26-1.

$T_{error}$ could be also calculated as $T_{target}$–actual_$T_{die}$ and then multiplied by a negative $K(T_{die})$ so that the sign of the calculated value $T_{error}*K(T_{die})$ remains the same.

Maximum selector 27 is supplied with the output of adder 24-2 and with the value of a programmed minimum value, and selects the maximum thereof, thereby ensuring that the signal does not drop below the minimum value. Minimum selector 28 is supplied with the output of maximum selector 27 and with the value of a programmed maximum value, and selects the minimum thereof, thereby ensuring that the signal does not exceed the maximum value. Both selectors verify that the produced value of the controlled variable is within programmable limits.

Another multiplexer 26-2 receives the output of minimum selector 28 and a programmable value, e.g. the stored maximum value for the controlled variable as inputs. The selection input of multiplexer 26-2 determines whether the regulation loop is active (by selecting the output of minimum selector 28), or clamped to a fixed value which typically is the maximum value for the controlled variable. This is controlled by an activation control block 29 which receives, from memory 22, a temperature value algoTmin where the control loops shall start working, a control flag algo_on, and the actual temperature reading $T_{die}$. The activation control block 29 may perform a following logical operation to generate the selection signal algo_act for multiplexer 26-2:

If ((algo_on==1) and ($T_{die}$>algoTmin)) then
   algo_act=1 else algo_act=0

Finally, multiplexer 26-3 receives, as input, the output of multiplexer 26-2 (or a signal derived therefrom) or a fixed value from register 40-3, depending on a control value supplied to MUX 26-3. Register 45 is updated at the programmed update rate for the control loop and stores samples for the controlled variable, one for each update time point. These samples are then provided to the analog section 10 to control the respective system variables. In some instances a digital-to-analog converter is provided to convert the value into an analog value (such as a reference voltage). In other cases, the digital value can be directly fed to control a component of the power supply (such as a switching frequency), or is supplied to an external device to control its operation based on the measured (internal/external) temperature.

A further register 40 may be provided to store the associated values and make them available to external devices. For example, the (optionally filtered) temperature reading $T_{die}$ and the error signal $T_{error}$ may be stored in register 40 and made available to an external device. In the same way, registers 40-1 and 40-3 may receive values from an external device, which may be fed in to the regulation loop based on associated control signals.

Figure 3:
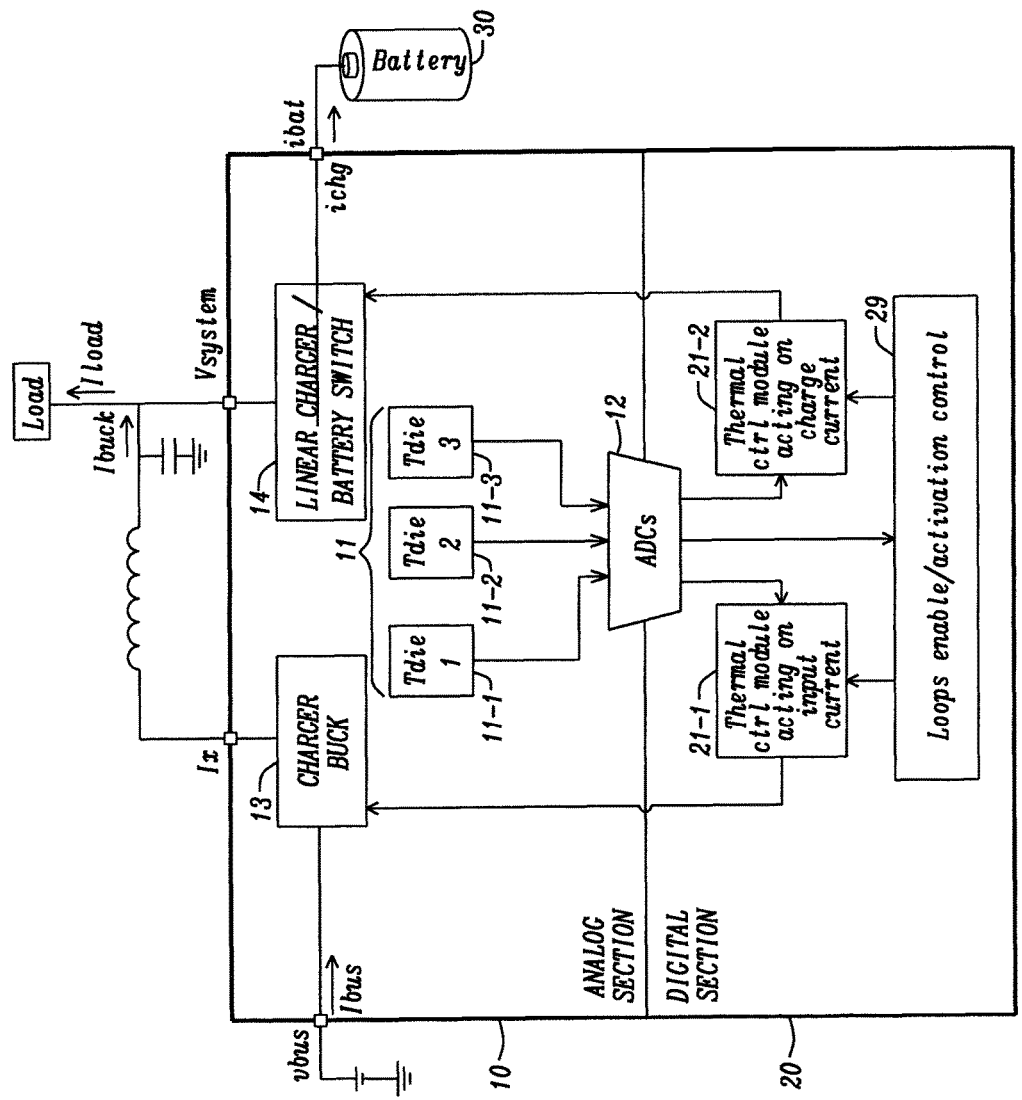
FIG. 3 shows an embodiment where 2 control loops are used in a battery charger application.

FIG. 3 shows an example of implementation where 2 control loops are used in a battery charger: one loop to control the charging current; the second loop to control input current. The analog section 10 comprises a charger buck 13 to generate a voltage $V_{system}$ from an input voltage $V_{bus}$; and a linear charger or a battery switch 14 to provide a controlled charging current $i_{chg}$ for charging a battery 30. The charger buck input current is $i_{bus}$; the charger buck output current is $i_{buck}$; $i_{load}$ is the current provided to an external load ($i_{buck}$–$i_{load}$ is the linear charger/battery switch input current) and the linear charge/battery switch current is $i_{chg}$.

Three temperature sensors 11 are provided: one 11-1 to measure the charger buck temperature $T_{die1}$; a second 11-2 to measure the general IC temperature $T_{die2}$; another 11-3 to measure the linear charger/battery switch temperature $T_{die3}$. The digital control module 21 has 2 parts: a thermal control module 21-1 acting on the buck input current $i_{bus}$ as controlled variable; and a thermal control module 21-2 acting on the charge current $i_{chg}$ as controlled variable. Activation control block 29 enables the individual control loops when the respective conditions are met (see below).

Figure 4:
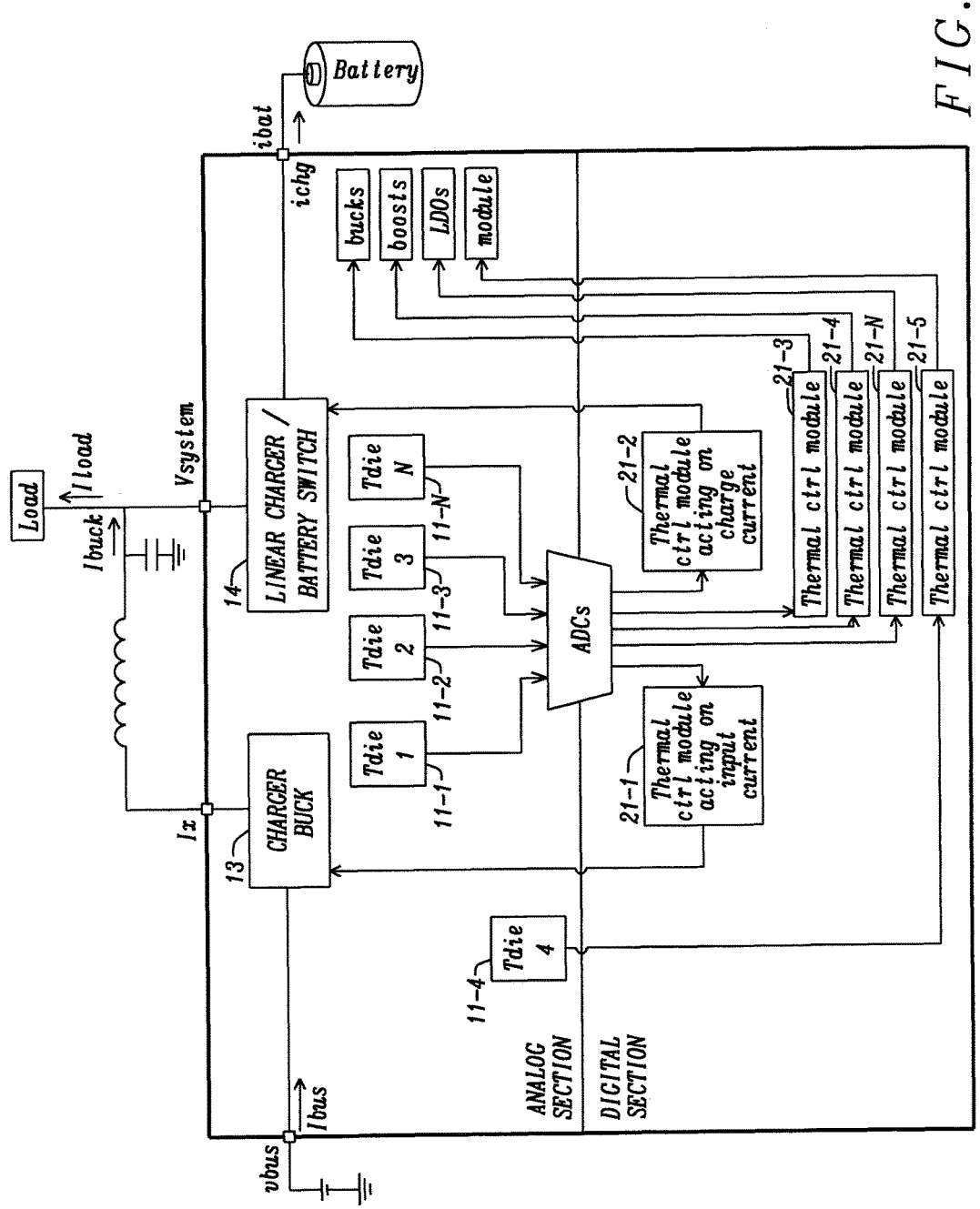
FIG. 4 shows a further embodiment where additional control loops are used to control further possible signals and variables.

FIG. 4 shows a further example of implementation where additional control loops are used to control further possible signals and variables. The power supply device (e.g. battery charger) has N temperature sensors 11-1 to 11-N to measure temperatures $T_{die1}$ to $T_{dieN}$. A number of digital control module parts 21-1 to 21-N are provided to implement N control loops, acting on the charger buck 13, the linear charger/battery switch 14 and further modules such as additional buck or boots converters, LDOs, etc.

FIG. 5 is a schematic diagram to explain the possibility to build up different control schemes based on the programmability of the proposed system; in this case of the target temperature for each loop. FIG. 5 shows an example with three (N=3) temperature thresholds of 120 deg C., 130 deg C., and 140 deg C. indicating corresponding target temperatures for different signals 1, 2, 3. Once a respective threshold temperature is reached, the corresponding signal is activated to be acted upon, e.g. when reaching 120 deg C., the control loop to act upon signal (controlled variable) 1 is activated to reduce the temperature. If this is not successful and the temperature reaches 130 deg C. (threshold 2), the control loop to act upon signal (controlled variable) 2 is activated as alternative or in addition to the control loop for signal 1. In the same way, if the temperature rises above 140 deg C. (threshold 3), the control loop to act upon signal (controlled variable) 3 is activated.

Figure 6:
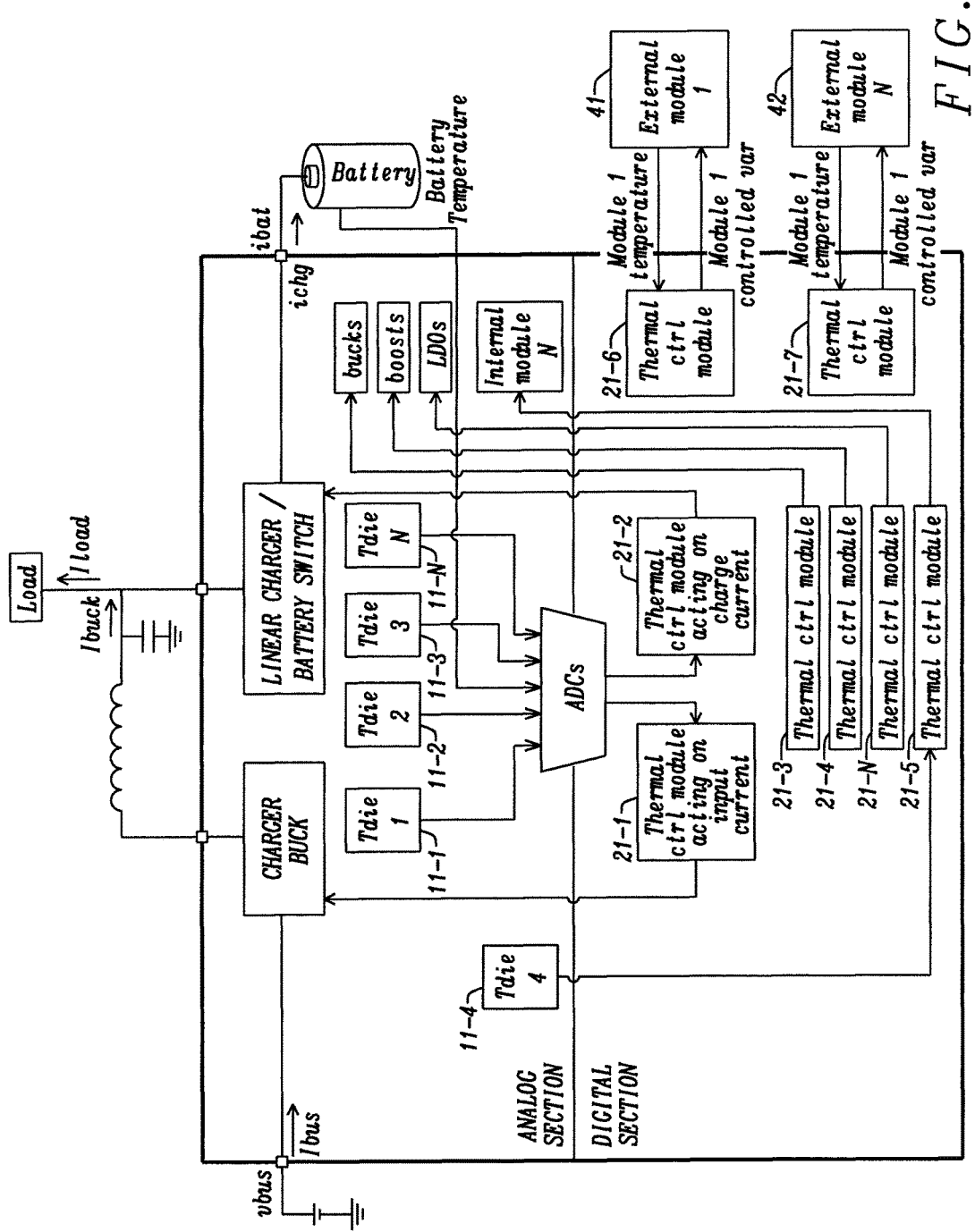
FIG. 6 shows another embodiment to illustrate further variations in terms of number of control loops.

FIG. 6 shows another implementation example to illustrate further variations, e.g. in terms of number of control loops implemented, types of modules (internal and external) that are controlled, etc. In the example of FIG. 6, external modules 41, 42 are controlled, too. Their respective temperatures are received by the power supply device and supplied to corresponding thermal control modules 21, which each implement a control loop for regulating the temperature of the corresponding external module. The thermal control modules produce controlled variables for their respective external module, which are output by the power supply device and supplied to the external modules.

In the following, further details about embodiments for the thermal control method usable in the above examples are provided. The method can be used, for example, for controlling and regulating the internal temperature of battery management circuits for portable devices. The method can be extended to power management integrated circuits for portable devices.

In a general notation, the method is applied to a system S with an internal temperature T. System S may be a battery charger or a PMIC for portable devices. In general, temperature T is function of n variables (charge current, system input current, input voltage, ambient temperature, . . . ) and k constants (thermal resistance, etc). If the result of operating system S under the n variables and k constants causes the internal temperature T>=$T_{target}$, the control method acts on m of the n variables, with m<=n, in order to regulate the system temperature T (e.g. so as T=$T_{target}$). If the system status (n variables and k constants) causes the temperature T<$T_{target}$, the control method doesn't act.

The m controllable variables may be, as example:
charge current$_{chg}$ of a battery charger
digital circuit frequency
buck or boost switching frequency
supply current (e.g. $V_{bus}$ input current in a battery charger)
output voltage of a buck or boost converter
input voltage of a buck or boost converter
input current of a buck or boost converter
input voltage of a battery charger
output voltage of an LDO or a linear charger
input voltage of an LDO or a linear charger
output current of an LDO or a linear charger or a battery switch Each single controllable variable (when used) is controlled by a dedicated closed loop. The dedicated closed loop embeds a digital control process. The digital control may be implemented, e.g. by a PID controller (but it can be extended to other methods).

The same digital control block (e.g. same HDL code) can be used for all the variables, but each variable has its own control loop due to the programmability of the generic control block. The following are examples of programmable aspects of the control loop: control coefficients, target temperatures that should be regulated, temperature enable thresholds, minimum and maximum values for the controlled variable, temperature acquisition rate, controlled signal update rate, enable/disable of a control loop depending on the charging phase, etc.

Figure 8:
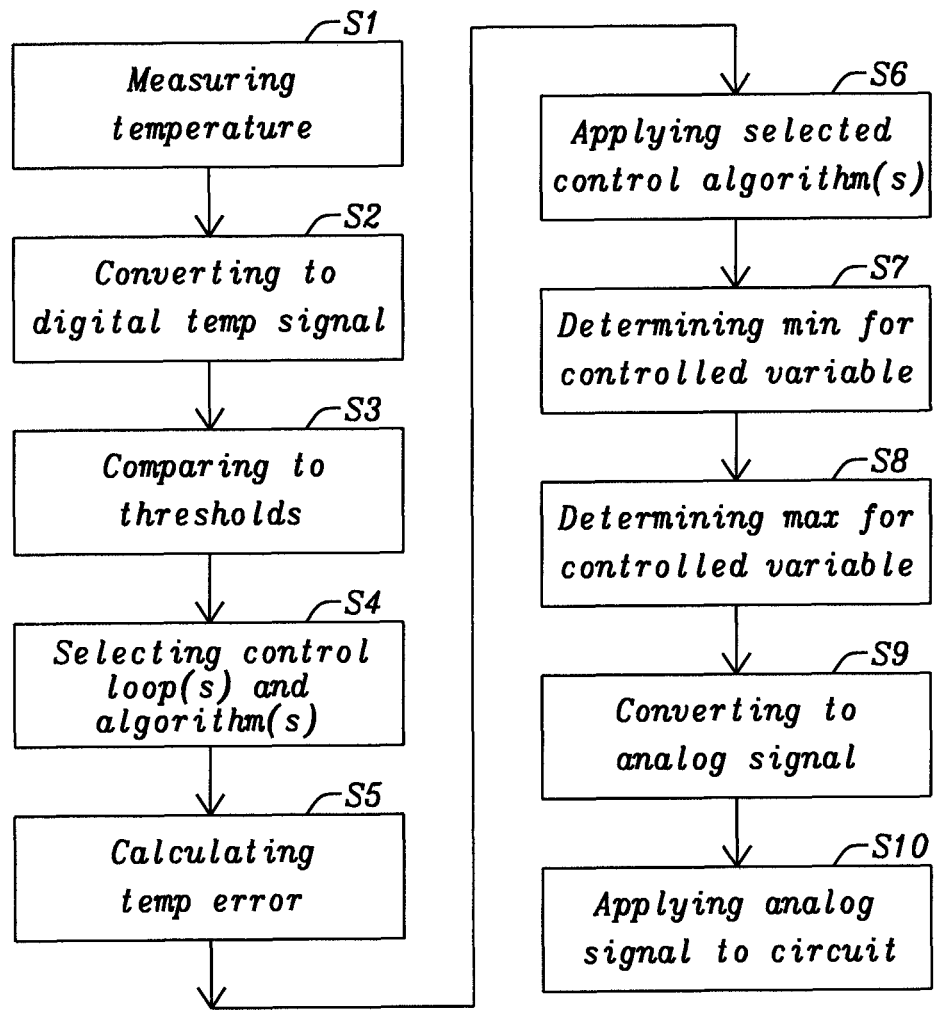
FIG. 8 shows in a flow for an embodiment of a digital control loop.

In embodiments, the digital control loop method comprises the following steps shown in the flow chart of FIG. 8:

S1. Measuring of the temperature internal to the IC. (The temperature can be measured by one or more temperature sensors that provide an analog signal related to the temperature. The temperature may be internal to the IC or external.)

S2. Converting the analog signal relating to the temperature value into a digital signal. (This may be done with an ADC.)

S3. Comparing the converted temperature data to some programmable temperature thresholds to determine if a control loop should act and which temperature range to use.

S4. Selecting behavior, coefficients, data defining the control loops according so to the thresholds. (Parameters may be determined based on the determined temperature range, thereby providing adaptive control where the control parameters depend on measured temperature.)

S5. Calculating a temperature error between the measured temperature and a target temperature. (The target temperature may depend on the control loops.)

S6. Applying a control algorithm based on the selected coefficients, the calculated temperature error and the last signal value applied to the analog circuit and calculating the new control signal/variable. (Different types of control algorithms may be used.)

S7. Comparing the new control/signal value with the "default" value set by the system if no thermal control would be present and selecting the minimum of the 2 signals. (Typically, the default value is the maximum control value, e.g. a maximum current, that is reduced/replaced by the new control value if the control loop is active in order to reduce the temperature.)

S8. Comparing the result of the previous comparison with the programmed minimum value and selecting the maximum of the 2 values. (The minimum control value that can be used ensures proper operation of the system. If necessary, another control loop may be activated if the minimum control value is reached.)

S9. Converting the digital signal in an analog signal.

S10. Applying the analog signal to the analog circuitry. (The analog signal can control system behavior and thereby affect temperature.)

It is to be noted that the above steps must not be executed in the shown order and the skilled person will appreciate that different orders are possible and some steps may be performed in parallel. For example, steps S7 and S8 may be swapped.

The way how the plurality of control loops work and interact together may be controlled by an enable mechanism. The enable mechanism selects the loops that are enabled (ON) based on a certain device (IC) status. Which loop is effectively acting is established by an activation mechanism (see below). The enable mechanism may comprise the following steps:

Read the IC status: e.g. fast charge, no charge, pre-charge on a battery charger; or the generic device status of a generic IC.

Enable one or more of the control loops implemented in the device depending on the IC status.

Note: These enabled loops are named "running", they are active, so ready to regulate, but this doesn't mean that they are really regulating. Whether they really regulate depends on the measured temperature value(s) and if they are activated by an activation mechanism described in the following.

One or more of the enabled thermal control loops is/are activated according to the following activation mechanisms. The activation mechanism defines the order in which the loops will act if more than one loop is enabled by the above enable mechanism. In general, an active loop acts on the controlled variable in order to reduce the internal temperature only if the measured temperature exceeds the associated target temperature.

The activation order can be based on a priority mechanism, or can change during runtime accordingly to the IC status. The following activation mechanisms may be used:

1. Target temperature based activation mechanism: the loop acting as first is the one with lower target temperature.
2. Fixed priority activation mechanism: the loops are activated according to a programmed order. For example, in a battery charger with 2 control loops implemented (regulating charge current and input current), the priority could be programmed in setting the charge current loop acting as first and the input current loop as second. All the loops can have the same target temperature.
3. Temperature map activation mechanism: the activated loops are the ones that control the power dissipation of the module (or of the IC local area) with higher local temperature. If more than one controlled variable affects the module (or the IC local area) power dissipation, a priority order may be provided.

Hereafter is a more detailed description of example implementations for the 3 activation mechanisms:

The target temperature based activation mechanism is based on the use of different target temperatures for the different loops. The loop having the lowest target temperature is selected to act as first.

The fixed priority activation mechanism may be implemented as a method comprising the following steps:

1. Set the priority order between the control loops (e.g. charge current first, then input current, then output voltage). The priority order is one of the possible programmable options of the digital control module.
2. When $T_{target}$ is exceeded, the first variable that is controlled to keep the internal temperature $T<=T_{target}$ is the controlled variable with the higher priority (e.g. charge current).
3. The controlled variable with priority i+1 (priority i>priority i+1) starts to be controlled only after the controlled variable with priority i has reached a predetermined value programmed for that variable (e.g. when the controlled variable with priority i has been reduced to a minimum value for this variable, but the internal temperature T keeps on increasing over $T_{target}$).
4. When the controlled variable with priority i+1 is the controlled variable, the variables with priority<i+1 are all fixed at their minimum value. The variable with priority i can restart to be increased after the variable with priority i+1 has been increased back to its maximum value (e.g. because the system is cooling down).

The temperature map activation mechanism may be implemented as a method comprising the following steps:
1. Reading all or a part (according to configuration) of the internal temperature sensors.
2. Converting the analog signal(s) related to a temperature value into digital signal(s).
3. Reading the status of sub-modules (mainly if they are ON or OFF) that are part of the IC under control and that are affected by the controlled signal variable.
4. Elaborating the temperature information, priority lists and sub-module status in order to select the acting loop (as example, the selected loop is the loop that controls a variable that affects the power loss of the module that is ON and that has a higher temperature).

Figure 7:
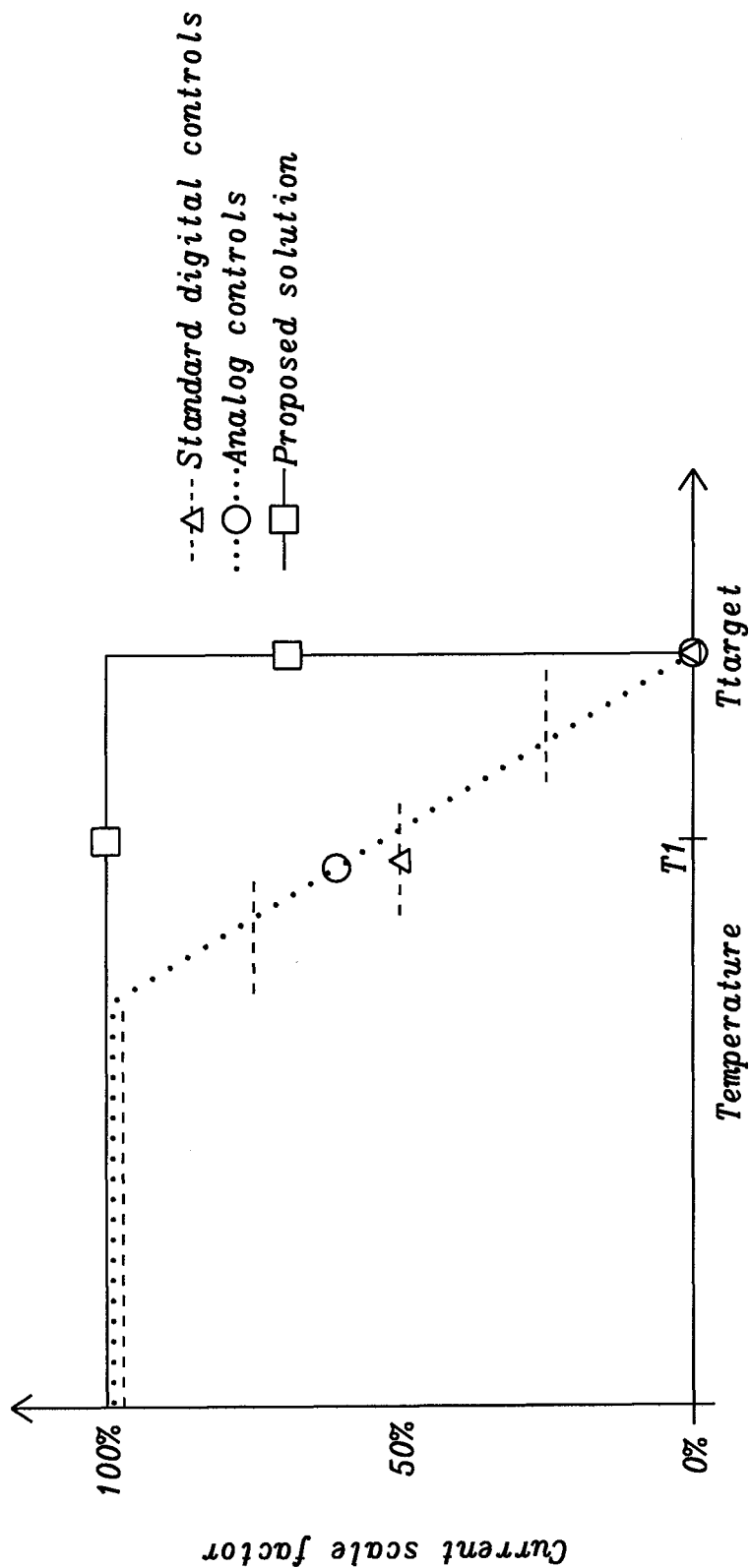
FIG. 7 compares different thermal regulation approaches.

FIG. 7 illustrates an effect of the proposed solution with respect to thermal regulation implemented by the prior art. In the figure, controlled currents set on 2 temperature operating points ($T_1$ and $T_{target}$) by different control approaches are highlighted by square, dot and triangle symbols.

In an analog control (dotted line marked with dot), the control method starts decreasing the controlled variable (in a battery charger, e.g. the charge current only or the input current only is controlled) before reaching the target temperature. The variable (current) is set to 0 when the $T_{target}$ is reached. In a digital control (horizontal dashed lines marked with triangle), the control method makes something similar, but with discrete temperature thresholds and current steps. In both prior art methods, an operating point is reached that is sub-optimal with respect to the proposed solution which maintains 100% current at $T_1$ and only reduces current for $T_{target}$ (see line marked with squares).

As already mentioned the same control loop can be used to control other external devices that are supplied by a power supply that implements the proposed solution (see e.g. FIG. 6). The only information that this external device should provide to the power supply IC implementing the proposed solution is the temperature information. Once the temperature information is acquired, as example but not limited to, by analog to digital converter, digital communication interface etc, the temperature can be controlled by controlling, as example, the supplied current or voltage (but also all the other signals that can control the power dissipation). One possible example is a battery connected to a battery charger. The charge current can be controlled in order to avoid that a programmed target temperature of the battery is exceeded.

The proposed solution has another advantage that is the possibility to access the control loop by an external device (e.g. but not limited to, an external CPU, FPGA, etc) both as output and as input by reading data internal to the IC or writing data to the IC. Data read from registers 40 in FIG. 2 can be, e.g. but not limited to, the internal temperature, a pre-processed internal value, etc. Data written to registers 40 can be the controlled variable, a pre-processed data used by the loop, etc. Possible access points (input or output) for a loop interaction may be the registers 40 in FIG. 2. This approach can be very useful for several different applications:

Implement a new digital control to be used in the next generation of the IC.

Implement the control loop fully or partially externally, e.g. on an external CPU or on an FPGA. Partially means that the main control can be applied internally, but in certain cases an external device can make some update (e.g. coefficients, etc).

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A digital temperature control method for power supply devices, the control method comprising the steps of:
    measuring a temperature of a power supply device;
    converting the measured temperature to a digitized temperature;
    comparing the digitized temperature to at least one temperature threshold;
    selecting a digital control algorithm from a plurality of digital control algorithms and applying the selected digital control algorithm on a controlled system variable associated with the selected digital control algorithm, thereby obtaining a control value;
    verifying the obtained control value; and
    applying the verified control value to control the power supply device to supply power to an external device.

2. The control method of claim 1, wherein the selecting a digital control algorithm is performed based on a power supply status that is applied to supply the power to the external device.

3. The control method of claim 1, wherein the measured temperature is compared with a plurality of temperature thresholds and the selecting a digital control algorithm is performed based on a comparison result of comparing the measured temperature with said plurality of temperature thresholds.

4. The control method of claim 1, wherein the selecting a digital control algorithm is performed based on a priority assigned to each digital control algorithm.

5. The control method of claim 1, wherein the selecting a digital control algorithm is performed based on a target temperature assigned to each digital control algorithm.

6. The control method of claim 1, wherein a plurality of chip temperatures are measured, each chip temperature associated with a digital control algorithm, wherein the selecting a digital control algorithm is performed based on the measured chip temperatures.

7. The control method of claim 1, wherein the digital control algorithms which are each programmable closed loop control algorithm has at least one programmable control parameter.

8. The control method of claim 1, wherein at least one digital control algorithm has different control parameters for different temperature ranges and wherein the selecting a digital control algorithm comprises selecting control parameters for the at least one digital control algorithm based on the measured temperature.

9. The control method of claim 1, wherein the controlled system variable relates to an internal voltage or an current of a power supply device, or a voltage or a current supplied to the external device.

10. The control method of claim 1, wherein the measured temperature or measured temperatures relate(s) or relate to an internal temperature of a power supply device, or an external temperature of the external device.

11. The control method of claim 1, wherein the verifying the obtained control value comprises comparing the control value with a minimum value and/or a maximum value of the controlled system variable associated with the selected digital control algorithm.

12. A power supply device for providing power to an external device, using a digital temperature control method comprising steps of:
   measuring a temperature of the power supply device;
   converting the measured temperature to a digitized temperature;
   comparing the digitized temperature to at least one temperature threshold;
   selecting a digital control algorithm from a plurality of digital control algorithms and applying the selected digital control algorithm on a controlled system variable associated with the selected digital control algorithm, thereby obtaining a control value;
   verifying the obtained control value; and
   applying the verified control value to control the power supply device to supply the power to the external device.

13. The power supply device of claim 12, comprising an analog section having a power supply unit and at least one temperature sensor to measure a local die temperature of the power supply unit, an analog-to-digital converter and a digital section having a control unit and a memory to store programmable parameters to the digital control algorithms.

14. The power supply device of claim 13, wherein the power supply unit comprises a buck converter and a linear charger or a battery switch, wherein the controlled system variables includes at least an input current to the buck converter and a charging current provided to the external device by the linear charger or by the battery switch, wherein the external device being a rechargeable battery.

15. The power supply device of claim 13, wherein the power supply unit comprises a linear charger and an optional battery switch, wherein the controlled system variables includes at least an input current to the linear charger and a charging current provided to the external device, wherein the external device being a rechargeable battery.

16. The power supply device of claim 12, wherein the power supply device is a power management control unit for a portable device controlling power dissipated by the portable device, at least one measured temperature corresponding to a load of the portable device.

17. The power supply device of claim 12, wherein the selecting a digital control algorithm is performed based on a power supply status that is applied to supply power to the external device.

18. The power supply device of claim 12, wherein the measured temperature is compared with a plurality of temperature thresholds and the selecting a digital control algorithm is performed based on a comparison result of comparing the measured temperature with said plurality of temperature thresholds.

19. The power supply device of claim 12, wherein the selecting a digital control algorithm is performed based on a priority assigned to each digital control algorithm.

20. The power supply device of claim 12, wherein the selecting a digital control algorithm is performed based on a target temperature assigned to each digital control algorithm.

21. The power supply device of claim 12, wherein a plurality of chip temperatures are measured, each chip temperature associated with a digital control algorithm, wherein the selecting a digital control algorithm is performed based on the measured chip temperatures.

22. The power supply device of claim 12, wherein the digital control algorithms are each programmable closed loop control algorithm has at least one programmable control parameter.

23. The power supply device of claim 12, wherein at least one digital control algorithm has different control parameters for different temperature ranges and wherein the selecting a digital control algorithm comprises selecting control parameters for the at least one digital control algorithm based on the measured temperature.

24. The power supply device of claim 12, wherein the controlled system variables relates to an internal voltage or an current of a power supply device, or a voltage or a current supplied to the external device.

25. The power supply device of claim 12, wherein the measured temperature or measured temperatures relate(s) to an internal temperature of a power supply device, or an external temperature of the external device.

26. The power supply device of claim 12, wherein the verifying the obtained control value comprises comparing the control value with a minimum value and/or a maximum value of the controlled system variable associated with the selected digital control algorithm.

* * * * *